Patented Apr. 29, 1941

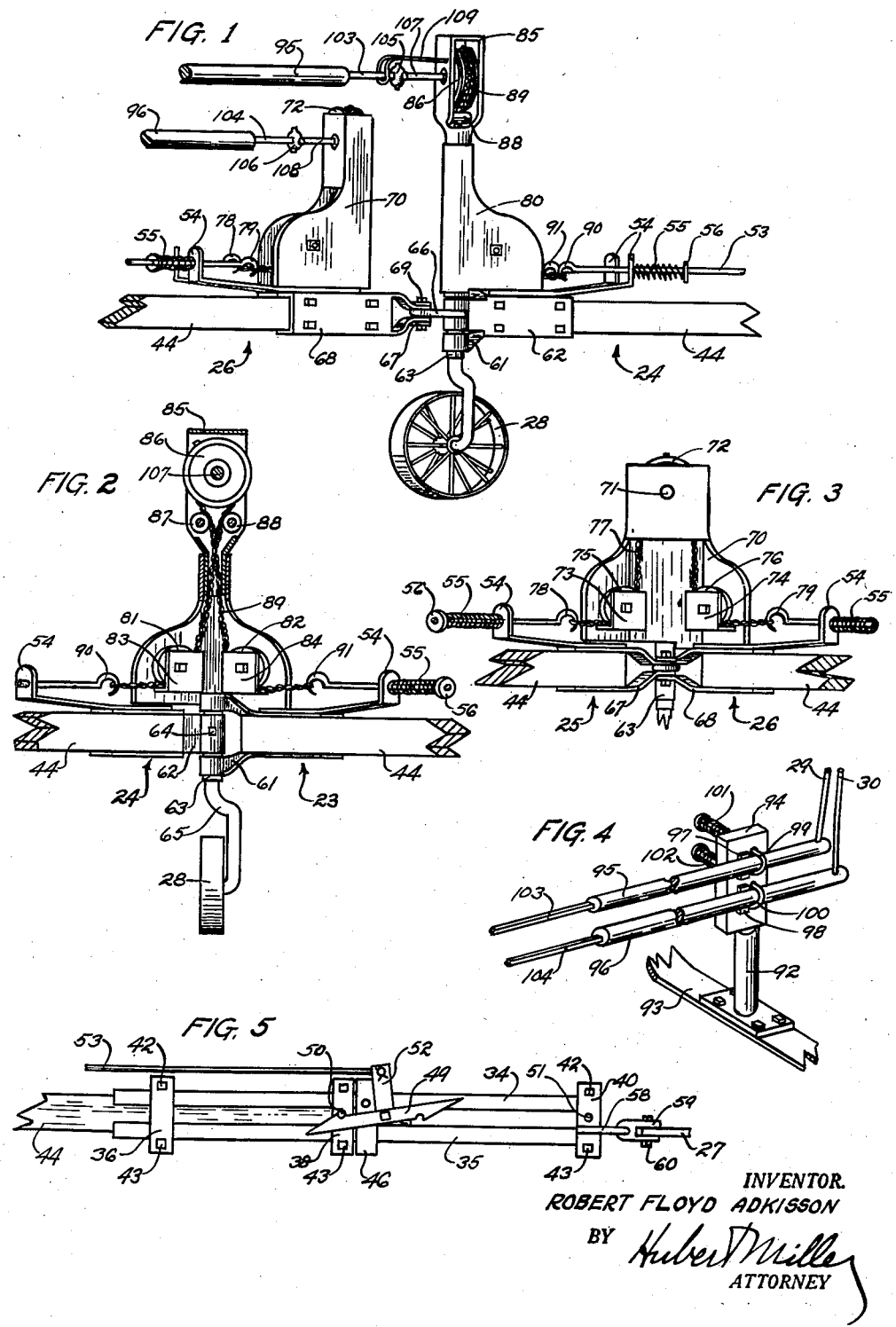

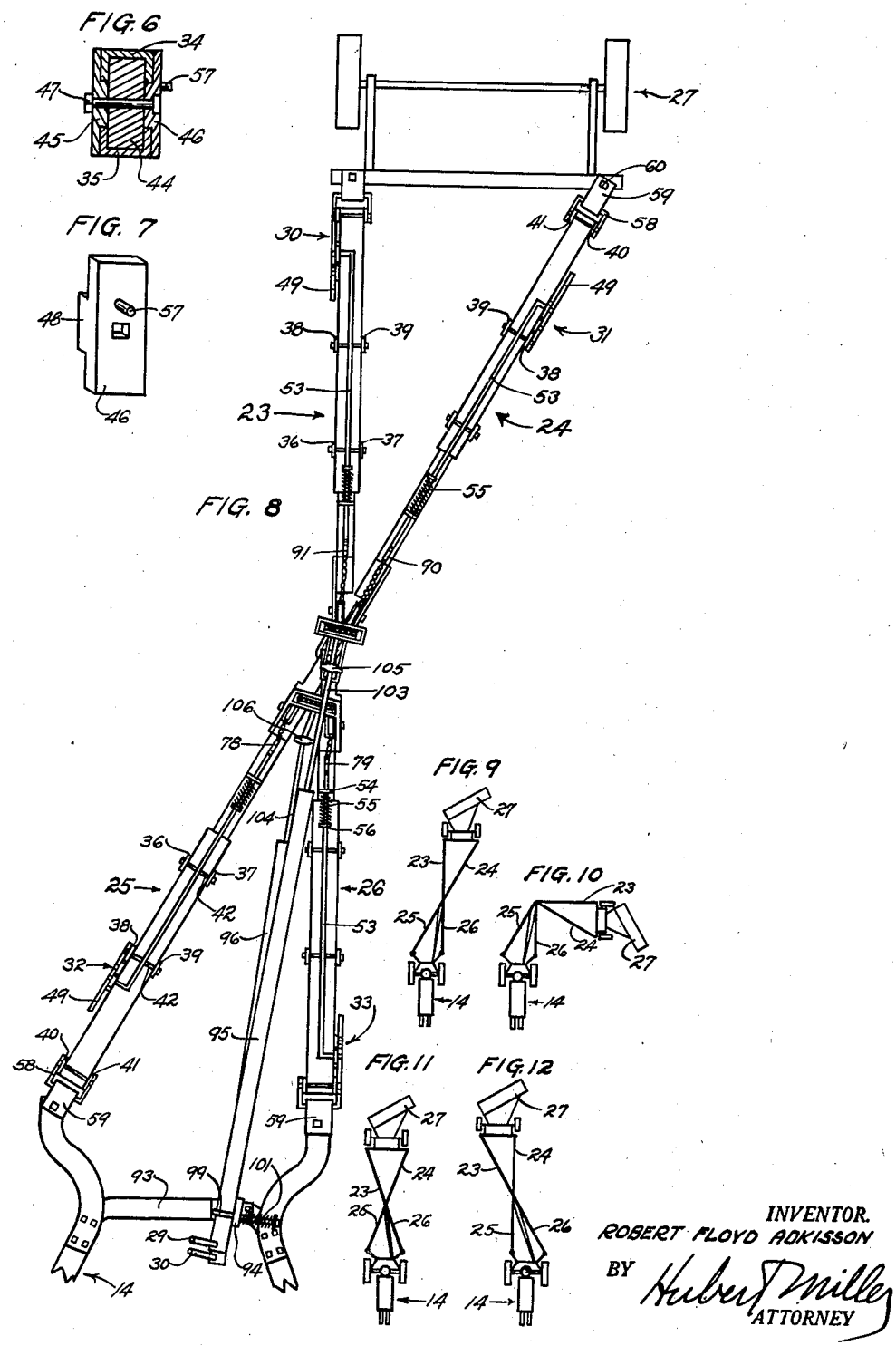

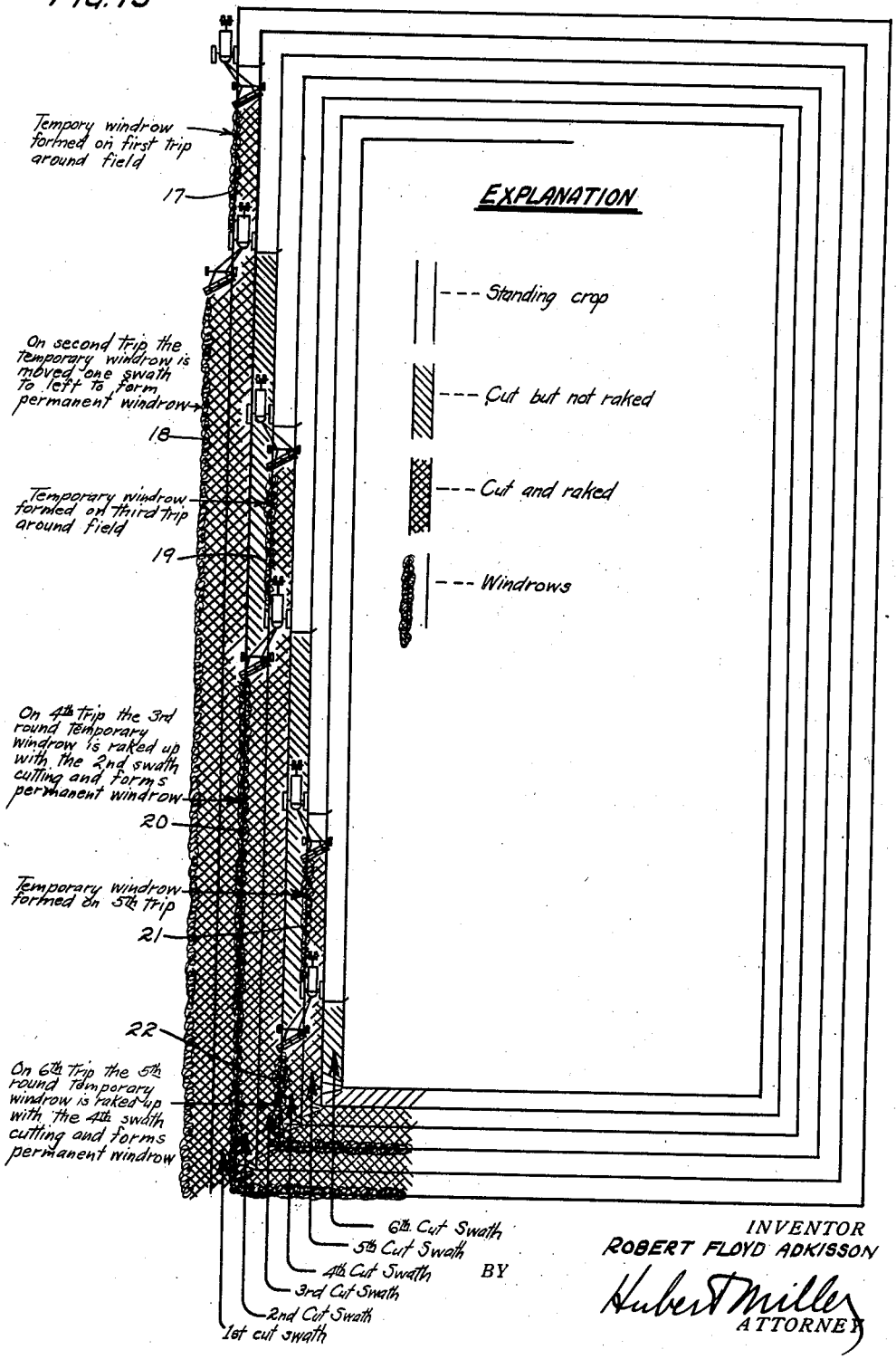

2,240,168

UNITED STATES PATENT OFFICE 2,240,168

METHOD OF CUTTING AND RAKING FARM CROPS

Robert Floyd Adkisson, Yukon, Okla.

Application August 8, 1938, Serial No. 223,644

1 Claim. (Cl. 56—1)

This invention relates to an improved method of cutting and raking hay and other similar farm crops, as well as to a tractor hitch which facilitates the practicing of the method.

Those familiar with farming known that it is present practice to use a side delivery rake of approximately the same width as the width of the swath cut by the cutter bar of the mower. When a tractor is used, the cutter bar, of course, extends to the right side of the path traveled by the tractor, and the side delivery rake is hitched to the tractor immediately behind the cutter bar, so that it follows the path of the cutter bar and rakes the cut hay into a windrow which extends lengthwise along the left hand edge of the path traveled by the cutter bar. If a seven foot cutter bar is used, then a side delivery rake is used which will rake 7 feet. Naturally, after an entire field is cut and raked, there remains in the field a number of windrows of hay, all windrows being spaced 7 feet apart. After the hay has dried sufficiently, it is ready for baling. In order to bale it, the hay must either be delivered to the baler, or a traveling or "pick up" baler must be used. If the hay crop is an average crop, or even some heavier than average, the capacity of the bailer is sufficient to handle all the hay lying in two of the seven foot windrows. The "pick up" baler, however, will only pick up the hay lying in one windrow, and it is, therefore, necessary for the baler to traverse the entire length of each windrow in order to bale the entire field of hay. In order to eliminate the necessity of pulling a heavy baler around the field so many times at half capacity, it is present practice, before beginning the baling operation, to first rake over the entire field a second time, raking each alternate windrow on to the windrow to its left, thus placing the hay in windrows which are spaced 14 feet apart, and of a size which will work the baler at full capacity. The second raking of the field is costly from the standpoint of valuable time lost, gasoline and oil burned, wear and tear on equipment, and extra man-hour-dollars needlessly spent. To eliminate this second raking of the field, 14 foot rakes have been tried and proved to be entirely impractical, because such a rake necessitates the use of a 14 foot cutter bar, which has proven even more impractical.

It is the chief object of my invention, therefore, to provide a method of simultaneously cutting and raking a field with a standard sized side delivery rake, in combination with a similar standard sized cutter bar, which method arranges the raked crop in windrows which are spaced apart a distance twice the width of the swath handled by the cutter bar or rake, yet which method does not necessitate raking the field a second time to so space the windrows.

It is a secondary object of the invention to provide a tractor hitch which, while not absolutely necessary to the practicing of my method, greatly facilitates its practice.

Other objects of the invention are: to provide a hitch which permits a rake or other farm implement to be pulled either directly behind a tractor, to the right of the path of the tractor, or to the left of the path of the tractor, all without placing undue side strain either on the tractor, on the hitch, or on the implement being pulled; to provide a hitch of this class by means of which the tractor operator may selectively position the implement with relation to the tractor (as just mentioned) without moving from his seat on the tractor; to provide a hitch which causes the implement following the tractor to properly cover the corners of a field as each turn is made; and to provide a device which is simple in construction, easy to operate, durable, and dependable.

The details of my method, as well as the details in the construction of a preferred form of my hitch, together with other objects of the invention, will be better understood from the following description when read in connection with the accompanying drawings, which are presented for illustrative purposes only, and in which Figure 1 is a side perspective view of a portion of a preferred form of my tractor hitch, and illustrates particularly the means for pivotally supporting it near its center, as well as the means for controlling the adjustment of certain members;

Figure 2 is a front perspective view of one portion of the apparatus shown in Figure 1;

Figure 3 is a front perspective view of another portion of the apparatus shown in Figure 1;

Figure 4 is a perspective view of the adjustment control levers and the means of mounting them;

Figure 5 is a side elevation of one of the four longitudinally adjustable elements, one of its ends being shown only fragmentarily;

Figure 6 is a cross section taken through one of said longitudinally adjustable elements;

Figure 7 is a perspective view of one of the traveling guides shown in Figure 6;

Figure 8 is a plan view of a preferred form of the hitch as a complete unit, and illustrates the manner in which it may be attached to an agricultural implement and to a tractor;

Figures 9, 10, 11 and 12 are diagrammatic illustrations of the various positions of adjustment of my invention for a tractor hitch; and Figure 13 is a schematic drawing illustrating my improved method for cutting and simultaneously raking a field crop.

The previously mentioned method per se will first be explained. In the first place, the method is more effective when a cutter bar or mower and a rake are simultaneously pulled by the same motive force. Whether a tractor, horses, mules, or other motive force is used, the cutter bar is invariably arranged to cut a swath along the right edge of the path traveled by the motive force, and a side delivery rake is arranged to follow the path of the cutter bar, raking the cut hay into a windrow extending along the left edge of the swath. This, of course, contemplates that the travel is clockwise around the outside of the field, which is usual.

My method contemplates cutting and raking a first swath around the outer edge of the field in the usual manner, as just mentioned. Instead of cutting and raking the second swath in the same manner, however, I position the cutter bar in the usual position, the width of one swath to the right of its position during the first round, but I position the rake a distance of two full swaths to the left of the cutter bar, or so that it travels a path along the left edge of the first round swath. In this position the rake moves the temporary windrow, formed during the first round, the width of one full swath farther to the left. During this second round, the swath which is cut by the cutter bar is not raked, but is permitted to lie where it falls. On the third trip around the field the cutter bar is, of course, moved one swath farther to the right. The rake is moved back into its position behind the cutter bar, where it rakes the third round cutting into a temporary windrow extending along the left edge of the third swath. During the fourth trip around the field the rake is again positioned a distance two full widths to the left of the cutter bar's new position, where it rakes up the temporary windrow formed during the third round, along with the swath which was cut during the second round but was not raked, and forms the two into another permanent windrow along the left edge of the second round swath. This permanent windrow is now spaced from the windrow positioned during the second round, a distance equal to two full swaths. The rake is substantially the same width as the cutter bar and it has traveled around the field the same number of times as the cutter bar, yet instead of leaving four windrows spaced apart the width of one swath, it has arranged two windrows spaced apart the width of two swaths. On each successive trip around the field the cutter bar cuts a swath immediately to the right of its previous cut, but the rake is alternately positioned behind the cutter bar, and the width of two full swaths to the left of the cutter bar, thus forming permanent windrows on each successive even numbered trip around the field.

The above described method may be more clearly understood by referring to Figure 13 of the drawings. In this figure the successive relative positions of tractor 14, cutter bar 15, and side delivery rake 16, are shown during the first six trips around the standing field crop. For purposes of clarity it will be assumed that the length of the cutter bar is such that it cuts a full seven foot swath of the standing crop, and that the side delivery rake is of a size which will rake a 7 to 7½ foot swath.

On the first trip around the field it will be seen that a 7 foot swath is cut, and since the rake is positioned directly behind the cutter bar, the cutting is raked into a temporary windrow extending along the left edge of this swath.

On the second trip a second 7 foot swath is cut, but instead of being raked it is permitted to lie where it falls. The rake, instead of being positioned behind the cutter, is positioned a distance equivalent to the width of two full 7 foot swaths to the left of the cutter bar. In this position the rake picks up the temporary windrow formed during the first trip, and moves it 7 feet to the left of its former location. I designate this as a permanent windrow simply to distinguish it from the temporary windrows. In Figure 13 this particular windrow is designated by the numeral 18, whereas the first temporary windrow is designated by the numeral 17.

On the third trip, the rake is again positioned directly behind the cutter and rakes the third cut swath into a temporary windrow 19 along the left edge of the third swath.

On the fourth trip, the rake is again positioned 14 feet to the left of the cutter bar, and the swath being cut by the cutter is permitted to lie where it falls, as shown by the code marking. In this position the rake picks up the temporary windrow formed during the third trip and rakes it up with the second cut swath, and forms both cuttings into a permanent windrow 20, extending along the left edge of the second cut swath.

Similarly on the fifth trip the rake is behind the cutter and forms a temporary windrow 21, which is moved 7 feet farther to the left on the sixth trip, and which together with the fourth cut swath is formed into a permanent windrow 22 extending along the left edge of the fourth cut swath.

The position of the rake is changed in this same manner on each alternate trip around the field, and in this manner forms permanent windrows around the entire field, which windrows are spaced 14 feet apart, instead of 7 feet.

Attention is also called to the fact that this same method may also be carried out in a slightly different manner, the difference lying in the work done on the first trip around the field. If preferred, the raking of the first cut swath on the first trip may be eliminated, and this first swath permitted to lie where it falls. In this case, on the second trip around the field, the rake would be positioned the same as shown for the first or third trips around the field in Figure 13. The result produced by changing the order of the steps of the method would simply be to arrange all the windrows 7 feet nearer to the center of the field. Instead of the first permanent windrow 18 being positioned 7 feet outside the edge of the standing crop, it would lie along the left edge of the crop.

It will be plain that the practicing of the above explained method would be greatly facilitated if a means were provided for easily shifting the side delivery rake from one to the other of the positions illustrated in Figure 13. My improved tractor hitch constitutes such a means, and will now be described.

Referring particularly to Figure 8, the hitch in general includes four elongated lengthwise adjustable elements, designated respectively by the numerals 23, 24, 25 and 26. The inner ends of these elements are pivotally connected together in a manner more clearly illustrated in Figures 1, 2 and 3. The outer ends of two of these elements are adapted to be attached to any desired agricultural implement 27 (Fig. 8) in a manner to permit limited pivotal movement in both a horizontal and a vertical plane, while the outer ends of the other two elements are adapted to be connected in a similar manner to a tractor 14. The weight of these four elements is partially supported at their central point of pivot by means of a caster wheel 28. In addition, I provide a pair of control levers 29 and 30 (Figs. 4 and 8) preferably mounted in a suitable manner on the rear end of the tractor, where they can be easily reached from the operator's seat. The lever 29 is arranged to selectively operate adjustment locking means 30 and 31 carried by the elements 23 and 24 respectively, while the other lever 30 similarly operates locking means 32 and 33 carried by the elements 25 and 26, respectively. As will be seen from Figure 4, these two levers are located as near to each other as possible, so that both of them may be grasped in one hand, and so that both may be moved in the same direction at the same time. The operative connections between these control levers and their respective locking means are so arranged that when both levers are turned in the same direction the locking means on alternate ones of said elements are released, thus permitting those particular elements to lengthen out, causing the hitch to assume the position shown in Figs. 8 and 9. This causes the implement being pulled to move from its position behind the tractor, as in Figure 11, to a position at one side of the tractor, as in Figures 8 and 9. If the tractor is now stopped, and its direction reversed a short distance, the two elements 24 and 25 will be shortened to the same length as the elements 23 and 26 in Figures 8 and 9, and their respective locking means will automatically lock them in that position. If the levers 29 and 30 are now turned in the opposite direction, the locking means on elements 23 and 26 will be released. Further forward motion of the tractor will cause these two elements to lengthen, as did the elements 24 and 25 previously, and the hitch will assume the position shown in Figure 12, forcing the trailing implement to assume a position at the opposite side of the tractor. By varying the limits of lengthwise adjustability, the movement of the trailing implement from side to side may be accurately governed. Figure 10 simply illustrates the ease with which a trailing vehicle may be turned when using my improved hitch.

Having generally explained the invention together with the details of its operation, I will now describe the details of construction.

The elements 23, 24, 25 and 26 are substantially identical in construction, so a description of one of these elements should suffice. Referring to Figure 5, each of these telescoping elements includes an elongated skeleton housing formed from a pair of channel irons 34 and 35, rigidly secured together in spaced relation by means of three pairs of opposed side plates, the three pairs of plates being designated (Fig. 8) by the numerals 36 and 37, 38 and 39, 40 and 41, respectively. These plates are held in position by bolts 42 and 43 passing through their opposite ends. As illustrated, one pair of the plates is positioned near each end of the said housing, and one pair between the two outer pairs. This elongated housing is adapted to slidably receive an elongated male element 44 which is somewhat longer than the said channel irons. Near its inner end the element 44 carries a pair of traveling guides 45 and 46, the cross sectional shape of which is shown in Figure 6, and which guides are rigidly secured to the element 44 by means of a bolt 47, the head of which is countersunk in the guide 46 as shown. The thick central portion 48 of each guide is of such width as to slide easily between the spaced edges of the channel irons 34 and 35.

In addition, each of the elements 44 pivotally carries near its inner end, intermediate the guides 45 and 46 and its extreme end, a dog 49, mounted to pivot in a vertical plane. This dog 49 is notched on its upper edge near one end, and on its lower edge near the other end. These notches are adapted to engage pins 50 and 51 respectively, which are integral with and project outward from the plates 38 and 40 respectively, and to thus selectively lock the element 44 against longitudinal movement within its respective channel iron housing. It is plain to see that the limit of relative longitudinal movement between the element 44 and its housing may be easily changed by re-locating the central plates 38 and 39. As a means of releasing the dog from contact with either the pin 50 or the pin 51, a trigger 52 is rigidly and centrally secured thereto. A rod 53 is pivotally connected to the trigger, and the other end of this rod passes through a guide bracket 54 (Figs. 1, 2, 3 and 8) which is rigidly secured in position near the outer end of the element 44. A spring 55 bears against the bracket 54 and against a washer 56, which is adjustably secured to the rod. This spring normally urges the rod 53 outward, and the rod therefore normally urges the dog 49 to rotate in a direction to lock it firmly against either of the pins 50 or 51, depending on the position of the dog. To limit the rotation of the dog 49 I provide a stop pin 57, which projects from the outer surface of the traveling guide 46, and which contacts the edge of the dog 49 when it is not in contact with either of the pins 50 or 51.

Referring to Figures 5 and 8, the construction of the means for pivotally attaching the outer ends of the elements 23, 24, 25 and 26 to a tractor or other implement will be clearly understood. A U-shaped element 58 has one of its legs rigidly secured, as by welding, to the outer surface of the plate 40, while its other leg is similarly secured to the plate 41. This element 58 is pivotally connected to a second U-shaped element 59, which in turn is adapted to be pivotally secured to a rake 27, or other implement, by means of a pin 60. This connection permits pivotal movement in a horizontal plane around the pin 60 and pivotal movement in a vertical plane around the cross pin of the element 58.

Referring particularly to Figures 1, 2 and 3 it will be seen that the elements 23 and 24 carry on the inner ends of their respective male elements, co-operating pivot brackets 61 and 62 respectively which pivot about a hollow sleeve 63. This sleeve is adjustably secured within the bracket 62 by means of a set screw 64. The sleeve is adapted to serve as a journal for the shank 65 of the caster wheel 28. A U-shaped element 66 has one of its legs rigidly secured as by welding, to one side of the bracket 62, as shown in Figure 1, and the other leg of this element 66 is similarly secured to the opposite side of the bracket.

The inner ends of the elongated elements 25 and 26 carry somewhat similar pivot brackets 67 and 68 respectively, the ends of which are bifurcated to receive the U-shaped element 66. A pin 69 serves to pivotally secure the four elements 23, 24, 25 and 26 together.

The details of construction of the means for controlling the operation of the dogs 49 will now be described. The inner end of the element 26 carries an upstanding angle plate (Fig. 3) 70, which serves as a pulley housing. A pin 71 serves to journal a chain pulley 72 in the upper end of this housing. A pair of plates 73 and 74, each of which has two integral adjacent side edges for properly spacing them from the two side walls of the housing 70, serve to journal chain pulleys 75 and 76 respectively. A chain 77 runs over pulley 72 and under each of the pulleys 75 and 76, and its two ends are respectively connected to hooks 78 and 79, which are either integral with or are attached to the inner ends of the two rods 53 which control the dogs 49 on the elements 25 and 26. When the pulley 72 is rotated clockwise (Fig. 3) the hook 78 is moved toward the pulley 75 against the tension of the spring 55, and thus releases the dog 49 from contact with either the pin 50 or the pin 51. At the same time, that portion of the chain which passes under the pulley 76 simply becomes slack, and the hook 79 and its respective dog are unaffected. It will be noted that since the housing 70 is mounted only on the element 26, the two elements 25 and 26 are free to pivot independently without materially effecting the operation of the pulleys, or either of the respective rods 53.

Similarly, the element 23 carries on its inner end a pulley housing 80, the details of which are more clearly illustrated in Figure 2. Pulleys 81 and 82 are similarly mounted on the inner surface of the two side walls, by means of plates 83 and 84 respectively. The upper end of the housing 80 differs from the housing 70 in that it is tubular, and serves to pivotally mount the tubular lower end of a smaller individual pulley housing 85, between the walls of which is journaled a pulley 86, and two idler pulleys 87 and 88. A chain 89 passes over the pulley 86, between the idler pulleys 87 and 88, where its two ends are crossed as shown, thence under the pulleys 81 and 82, and to the hooks 90 and 91 respectively, which in turn respectively operate rods 53 on the elements 23 and 24. When the pulley 86 is turned clockwise (Fig. 2) that portion of the chain which passes under the pulley 82 moves the hook 91 and its respective rod 53. The hook 90 is unaffected by this movement. Conversely, when the pulley 86 is turned in the opposite direction, the hook 90 and its rod 53 are moved, but the hook 91 is unaffected.

As a means of rotating the pulleys 72 and 86 in either direction, and thus remotely controlling the locking and unlocking of the dogs on the elements 23, 24, 25 and 26, I provide an upstanding sleeve 92 (Fig. 4) rigidly mounted preferably on the hitch bar 93 of the tractor. This sleeve 92 pivotally receives and removably supports the cylindrical end of a lever bracket 94, which in turn pivotally supports, near their outer ends, elongated members 95 and 96, to which the levers 29 and 30 are respectively secured. As illustrated the member 96 is slightly longer than the member 95, so that the lever 30 may be moved in either direction without contacting the end of the member 95. These members 95 and 96 carry flat lugs 97 and 98 respectively, the flat surfaces of which lie in planes substantially parallel to the respective levers 29 and 30. Hook shaped members 99 and 100 slidably pass through the bracket 94, and their hook shaped ends partially surround the members 95 and 96 respectively and thus pivotally support these members. The opposite ends of these hook shaped members carry compression coil springs 101 and 102 respectively which serve to urge the members 95 and 96 toward the adjacent surface of the bracket 94. Naturally, the lugs 97 and 98 tend to remain flat against the surface of the bracket 94 and thus normally maintain the levers 29 and 30 in an upright position.

Each of the members 95 and 96 is provided with a square bore hole extending inward from their inner ends a distance approximately equal to half their length. These bores respectively slidably receive square rods 103 and 104, the opposite ends of which are suitably connected to universal joints 105 and 106 (Figs. 1 and 8) respectively. These universal joints are in turn connected to stub shafts 107 and 108 respectively, which pass through the side walls of the housings 85 and 70 respectively, and are non-rotatably secured to the pulleys 86 and 72 respectively, for the purpose of rotating said pulleys. I find it desirable to provide a guide element 109 rigidly secured to the housing 85 to partially encircle the square rod 103 a short distance ahead of the universal joint 105. This element 109 does not serve as a weight carrying support, but simply serves to limit the rotation of the housing 85 with relation to the member 95, and thus prevents the universal joint 105 from locking.

In the foregoing pages I have described in detail my improved method of cutting and raking farm crops; I have also described the general construction of my tractor hitch, together with the details of its operation, and the details of its construction, and I believe that those familiar with the art would thereby be enabled to practice the method, and to construct and operate the hitch. While I have described a specific embodiment of the hitch I am aware that numerous alterations and changes may be made therein and I do not wish to be bound except by the prior art and by the scope of the appended claim.

I claim:

The method of simultaneously cutting and raking a farm crop which comprises the steps of: cutting a first swath around a standing field crop and simultaneously raking the cut swath into a temporary windrow extending along the outside edge of the swath; cutting a second swath around the standing crop, letting the cut swath lie where it falls, and simultaneously raking the first windrow (only) to move it the width of one full swath toward the outside edge of the field; cutting a third swath around the standing crop and simultaneously raking the cut swath into a temporary windrow extending along the outside edge of the third swath path; cutting a fourth swath around the standing crop, letting the cut swath lie where it falls, and simultaneously raking the last mentioned temporary windrow and the second cut swath and combining the two into a permanent windrow extending along the outside edge of the second cut swath; and repeating the last two steps until the entire field has been cut and raked into windrows which are spaced two swaths apart.

ROBERT FLOYD ADKISSON.